US009401044B1

(12) United States Patent
Kaufman (10) Patent No.: US 9,401,044 B1
(45) Date of Patent: Jul. 26, 2016

(54) METHOD FOR CONFORMAL VISUALIZATION

(71) Applicant: The Research Foundation for The State University of New York, Albany, NY (US)

(72) Inventor: Arie E. Kaufman, Plainview, NY (US)

(73) Assignee: The Research Foundation for The State University of New York, Albany, NY (US)

( * ) Notice: Subject to any disclaimer, the term of this patent is extended or adjusted under 35 U.S.C. 154(b) by 0 days.

(21) Appl. No.: 14/618,314

(22) Filed: Feb. 10, 2015

Related U.S. Application Data

(63) Continuation of application No. 13/627,741, filed on Sep. 26, 2012, now abandoned.

(60) Provisional application No. 61/539,230, filed on Sep. 26, 2011, provisional application No. 61/539,237, filed on Sep. 26, 2011.

(51) Int. Cl.
*G06T 17/10* (2006.01)
*G06T 11/00* (2006.01)
*G06T 15/04* (2011.01)

(52) U.S. Cl.
CPC .............. *G06T 17/10* (2013.01); *G06T 11/001* (2013.01); *G06T 15/04* (2013.01)

(58) Field of Classification Search
CPC ....................................................... G06T 17/10
USPC ........................................................ 345/582
See application file for complete search history.

(56) References Cited

U.S. PATENT DOCUMENTS

| | | | | |
|---|---|---|---|---|
| 5,544,283 A | * | 8/1996 | Kaufman | G06T 15/40 345/424 |
| 6,697,538 B1 | * | 2/2004 | Angenent | G06T 19/00 382/285 |
| 7,019,748 B2 | * | 3/2006 | Raskar | G06T 13/20 345/423 |
| 2002/0080349 A1 | * | 6/2002 | Armstrong | G01N 27/44721 356/246 |
| 2002/0140700 A1 | * | 10/2002 | Wenzel | G05B 19/00 345/442 |
| 2002/0146172 A1 | * | 10/2002 | Nair | G06K 9/20 382/195 |
| 2008/0147475 A1 | * | 6/2008 | Gruttadauria | G06Q 10/087 705/7.31 |
| 2009/0231337 A1 | * | 9/2009 | Carr | G06T 17/10 345/423 |
| 2011/0310101 A1 | * | 12/2011 | Prange | G01V 99/00 345/420 |

OTHER PUBLICATIONS

Qiu, Enclosed Five-Wall Immersive Cabin, ISVC 2008, Part I, LNCS 5358, pp. 891-900, 2008, Springer-Verlag Berlin Heidelberg 2008.*
Jin, Discrete Surface Ricci Flow, IEEE Transactions on Visualization and Computer Graphics, vol. 14, No. 5, Sep./Oct. 2008.*

* cited by examiner

*Primary Examiner* — Devona Faulk
*Assistant Examiner* — Hai Tao Sun
(74) *Attorney, Agent, or Firm* — The Farrell Law Firm, P.C.

(57) ABSTRACT

Provided is a method for obtaining a conformal mapping of first image data corresponding to a source mesh to a target mesh, by generating a template of the source mesh and a template of the target mesh, processing the generated source mesh template and the generated target mesh template to obtain a conformal mapping from the source mesh to the target mesh, mapping the first image data corresponding to the source mesh to second image data corresponding to the target mesh according to the obtained conformal mapping, and outputting a mapped texture corresponding to the mapped second image data to the display corresponding to the target mesh.

10 Claims, 7 Drawing Sheets

METHOD FOR CONFORMAL VISUALIZATION

PRIORITY

This application is a continuation application of U.S. patent application Ser. No. 13/627,741, filed Sep. 26, 2012, and claims priority under 35 U.S.C. §119(e) to U.S. Provisional Patent Application No. 61/539,230 filed on Sep. 26, 2011, and U.S. Provisional Patent Application No. 61/539,237 filed on Sep. 26, 2011, the entire content of each of which is incorporated herein by reference.

GOVERNMENT RIGHTS

This invention was made with government support under grant number CNS0959979 awarded by the National Science Foundation. The government has certain rights in the invention.

BACKGROUND OF THE INVENTION

1. Field of the Invention

The present invention relates generally to conformal visualization and, more particularly, to a method of interactive display arrangement retargeting using conformal visualization retargeting in virtual reality using conformal visualization.

2. Description of the Related Art

Virtual Reality (VR) environments are becoming increasingly popular. VR refers to a computer-simulated environment, which simulates a physical presence in the real world as well as in non-real world locations. One such environment is a Cave Automatic Virtual Environment (CAVE), which may also be called an Immersive Cabin (IC). A CAVE or IC may be provided by display on three, four, five or six of the surfaces of a cube, or even more surfaces on a multi-face polyhedron, within which a user is positioned. Although a six-surface IC may provide a more immersive feel for the user, such IC may be expensive and difficult to construct. Thus, an IC or other VR environment having less than six surfaces may be used. CAVEs are generally described in Cruz-Neira et al., *Surround-Screen Projection Based Virtual Reality: The Design and Implementation of the CAVE*, COMPUTER GRAPHICS Proceedings, Annual Conference Series, 1993. ICs are generally described in Qiu et al., *Enclosed Five-Wall Immersive Cabin*, Proceedings of the 4th International Symposium on Advances in Visual Computing 2008.

A number of visualization technologies have been developed for immersive exploration of large-scale complex data. An example is a Head-Mounted Display (HMD) that provides a larger field of view in a virtual environment compared to traditional desktop systems. The HMD uses stereoscopic pairs of images to provide improved perception of spatial relationships. While HMDs allow for arbitrary views in the virtual world, they are usually bulky and can cause eye fatigue. In contrast, ICs provide a more natural visualization without the need for a virtual avatar and allow for mixed reality applications. Building a fully enclosed IC, however, remains a difficult task and present engineering challenges including cost, facility access, and head and gesture tracking. Immersion in the virtual data is a function of different factors, such as sensory perceptions, interaction techniques, and realism of the visualization.

The disadvantage of partially-immersive environments, such as ICs with at least one missing display surface, is that important visual information is often lost due to distortion. While many applications may tolerate such lost information on one or more projection screens, partial loss of visual context will adversely affect user navigation capabilities and present critical limitations when used for exploration of certain data, such as medical data.

In VR, immersive systems such as the IC provide an important tool for the collaborative exploration of large three-dimensional (3D) data. Unlike head-mounted displays, these systems are often only partially immersive due to space, access or cost constraints. The resulting loss of visual information becomes an obstacle for critical tasks that need to utilize the users' entire field of vision. Thus, a technique which provides an advantage of providing quick and efficient mapping in fully-immersive systems to partially-immersive systems and vice-versa is needed.

SUMMARY OF THE INVENTION

The present invention has been made to address at least the above problems and/or disadvantages and to provide at least the advantages described below. Accordingly, an aspect of the present invention provides a method of interactive visualization.

According to one aspect of the present invention, a method is provided to obtain a conformal mapping of first image data corresponding to a source mesh to a target mesh, by generating a template of the source mesh and a template of the target mesh, processing the generated source mesh template and the generated target mesh template to obtain a conformal mapping from the source mesh to the target mesh, mapping the first image data corresponding to the source mesh to second image data corresponding to the target mesh according to the obtained conformal mapping, and outputting a mapped texture corresponding to the mapped second image data to the display corresponding to the target mesh.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. Detailed descriptions of constructions or processes known in the art may be omitted to avoid obscuring the subject matter of the present invention. Further, in the following description of the present invention, various specific definitions found in the following description are provided only to provide a general understanding of the present invention, and it is apparent to those skilled in the art that the present invention can be implemented without such definitions.

According to an embodiment of the present invention, a method for obtaining a conformal mapping of first image data corresponding to a source mesh to a target mesh is performed. The method generally includes generating a template of the source mesh and a template of the target mesh, processing the generated source mesh template and the generated target mesh template to obtain a conformal mapping from the source mesh to the target mesh, mapping the first image data corresponding to the source mesh to second image data corresponding to the target mesh according to the obtained conformal mapping, and outputting a mapped texture corresponding to the mapped second image data to the display corresponding to the target mesh. Further details regarding these operations are described below.

In the method, the source and target mesh may correspond to sides of a cube. For example, the source mesh may correspond to six complete sides of a cube, while the target mesh corresponds to five complete sides of the cube and one-fourth of a sixth side of the cube. Further, the sides of such a cube may correspond to an immersive display environment. For example, the sides of the cube may correspond to four side walls, a floor, and a ceiling of a display onto which the output mapped texture is displayed, and the sixth side of the cube corresponds to the ceiling of the display surface.

According to an embodiment of the present invention, at least one of the source mesh and the target mesh correspond to a partially-immersive visualization platform such as an Immersive Cabin (IC) having at least three sides. The image data used may be any of various types of data, including, but not limited to, medical, security, architectural data, etc.

Figure 1A:
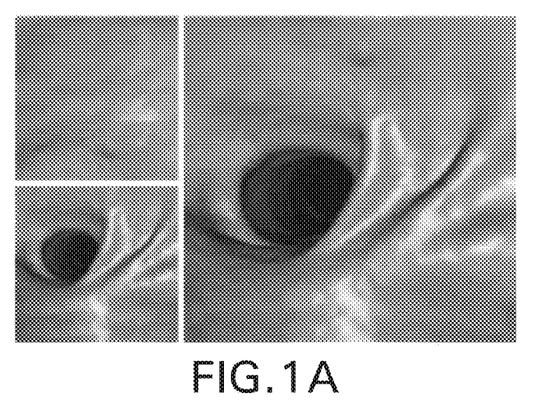
FIG. 1A is an example of conformal visualization applied to immersive virtual colonoscopy in a five-sided IC.
Figure 1B:
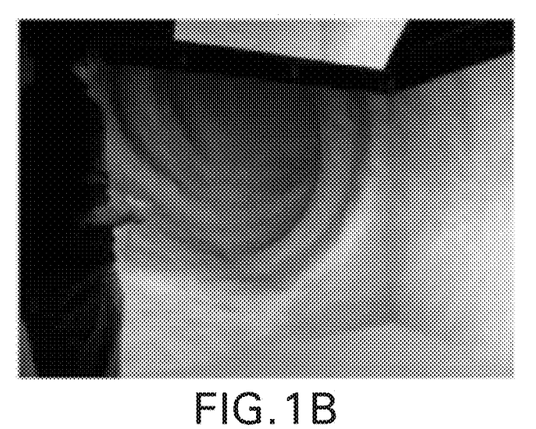
FIG. 1B shows a five-sided IC without conformal visualization.
Figure 1C:
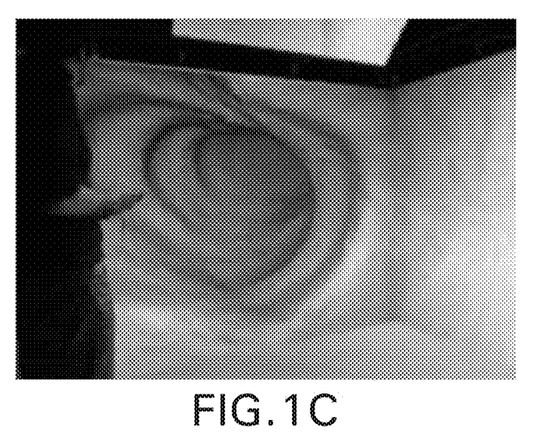
FIG. 1C shows a five-sided IC with conformal visualization.
Figure 2A:
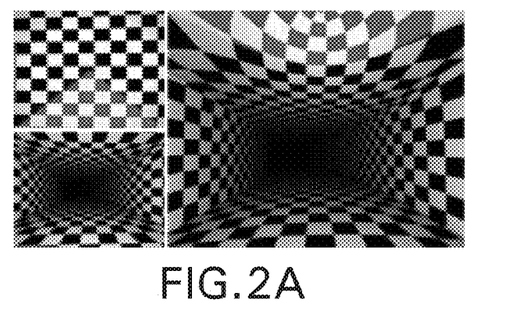
FIGS. 2A-2D illustrate navigation in a checkerboard tunnel with conformal visualization with a camera panning down.
Figure 2B:
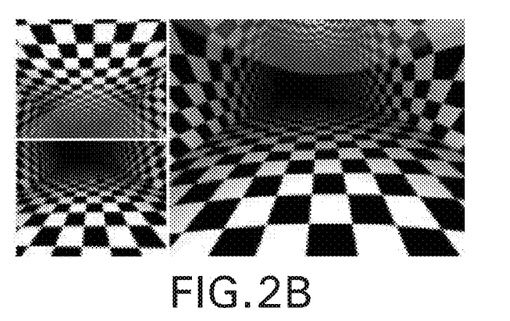
Figure 2C:
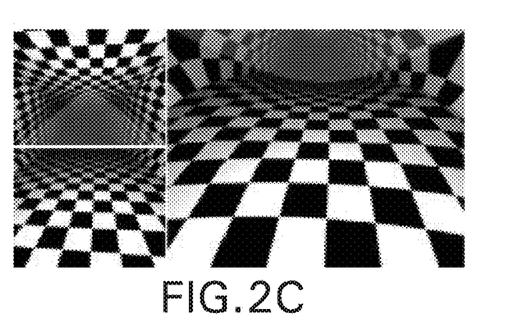
Figure 2D:
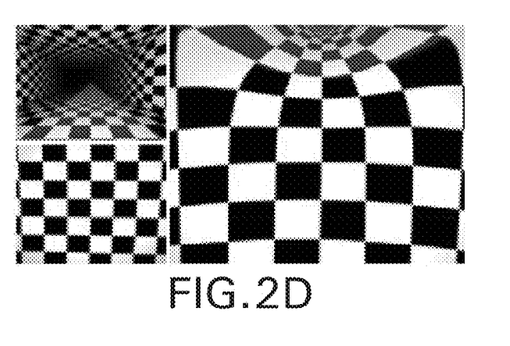

Referring initially to FIGS. 1A-1C, these figures illustrate snapshots of an immersive virtual colonoscopy in a five-sided IC, with FIG. 1A providing an example of conformal visualization applied to immersive virtual colonoscopy in a five-sided IC, FIG. 1B showing a five-sided IC without conformal visualization, and FIG. 1C showing a five-sided IC with conformal visualization.

Compared to a volume rendering performed without conformal visualization, as illustrated in FIG. 1B, the conformal visualizations shown in FIGS. 1A and 1C allow for a more thorough analysis of a projected dataset. In particular, an entire surface of the colon is visible during navigation of the colon. As can be seen in FIG. 1A, the conformal visualization preserves the shape of the polyp, which is important in medical diagnosis.

FIGS. 2A-2D illustrate navigation in a checkerboard tunnel with conformal visualization with a camera panning downward. Each triplet of images shows an original front view at respective lower-left panes, an original top view at respective upper-left panes, and a front view with conformal visualization respective right-side panes. The original views are provided for reference and the conformal view is rendered directly from the scene description with raytracing.

Figure 3A:
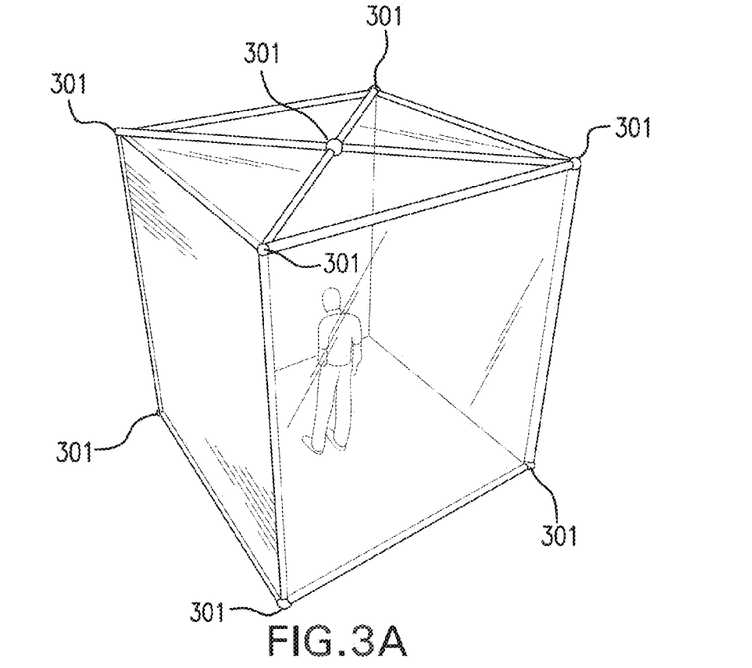
FIG. 3A is a cut source mesh for a five-sided IC.
Figure 3B:
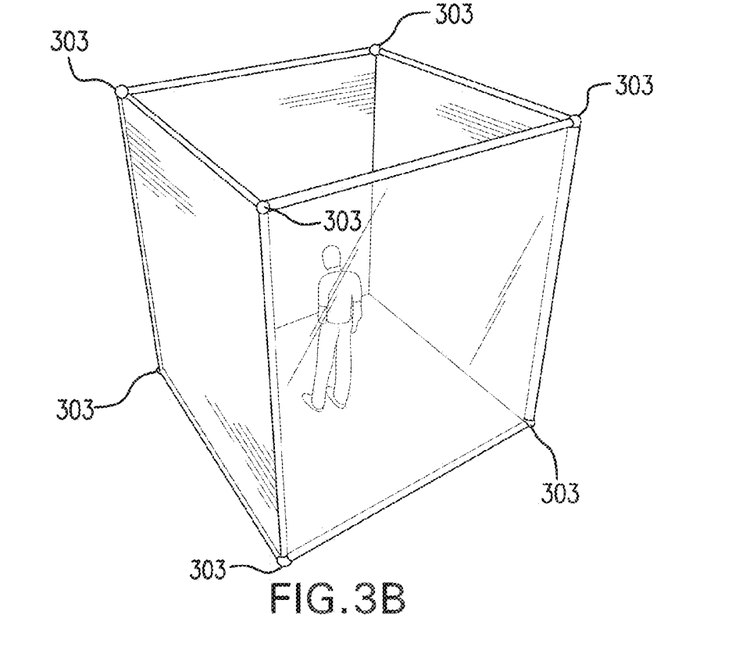
FIG. 3B is a target mesh for the five-sided IC.

FIGS. 3A and 3B illustrate mesh templates that represent various geometries. FIG. 3A is a cut source mesh for a five-sided IC, and FIG. 3B is a target mesh for the five-sided IC. The conformal visualization according to embodiments of the present invention provides an efficient pipeline for generating the conformal mapping at interactive speeds. The input is a user-specified rendering target, such as an n-sided IC or an arrangement of displays, as well as a set of parameters that control the accuracy of the generated maps.

Figure 4A:
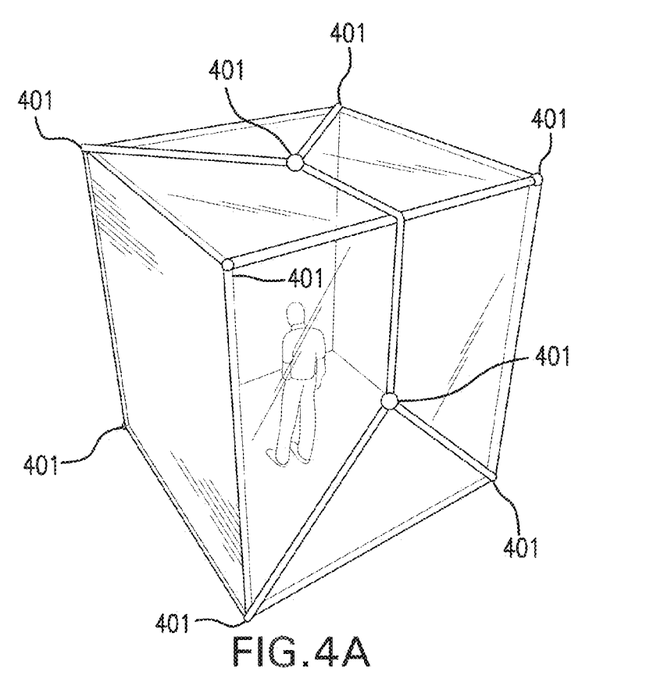
FIG. 4A is cut source mesh for a four-sided IC.
Figure 4B:
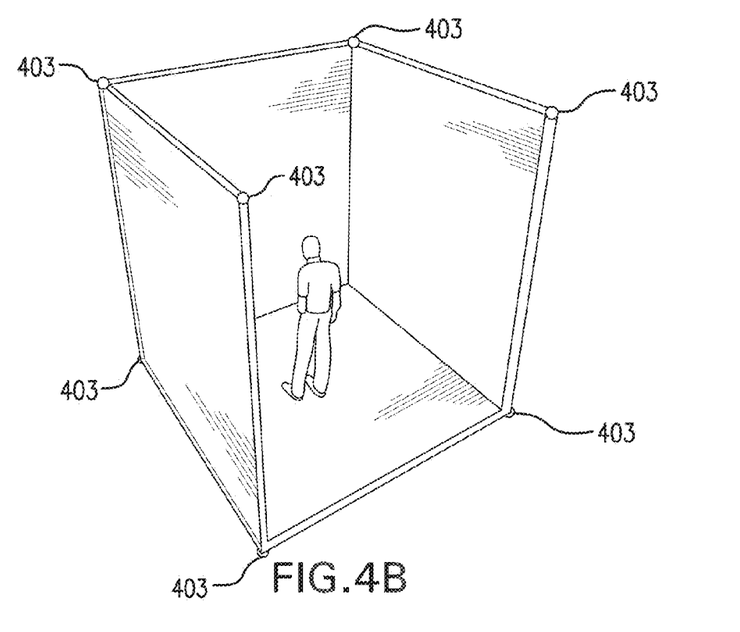
FIG. 4B is a target mesh for the four-sided IC.

In an embodiment of the present invention, a mesh processing toolkit is provided that utilizes a half-edge data structure to explicitly represent mesh connectivity information and to generate templates for the source and target visibility meshes. Although the conformal mapping is performed over visibility spheres, the geometries at this stage are simple cubes to facilitate a simpler definition of the visibility boundaries and cuts therein. FIG. 4A is cut source mesh for a four-sided IC, and FIG. 4B is a target mesh for the four-sided IC. FIGS. 3A and 3B illustrate templates for the five-sided IC, while FIGS. 4A and 4B illustrate templates for the four-sided IC. In both cases, the templates are parameterized with a reference point whose projection on the walls, which are shown as spheres 301 in FIG. 3A, spheres 303, in FIG. 3B, spheres 401 in FIG. 4A, and spheres 403 in FIG. 4B, defines intersection points of respective cuts.

Figure 5A:
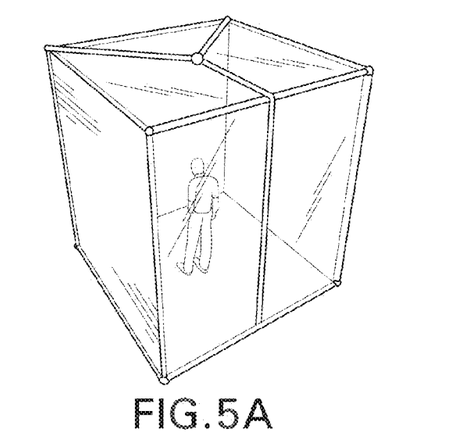
FIG. 5A is a cut source for a three-sided IC.
Figure 5B:
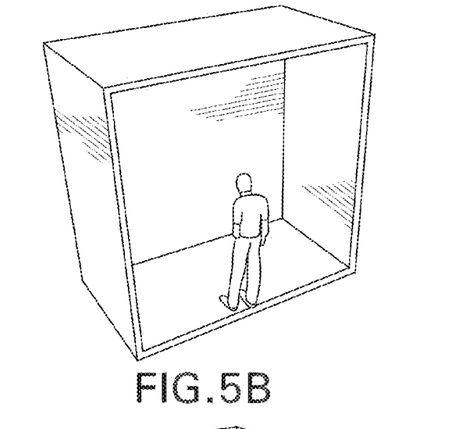
FIG. 5B is a partial visibility source for the three-sided IC.
Figure 5C:
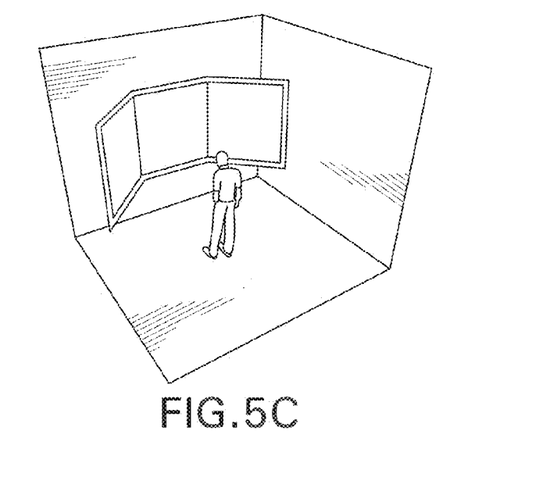
FIG. 5C is a target mesh for the three-sided IC.

A similar template can be defined for the three-sided IC as illustrated in FIG. 5A. However, due to an increased cut length, mapping to an arrangement of displays is not practical as the distortion becomes too large. Accordingly, for the target mesh of FIG. 5C, only a hemisphere of the original viewing directions is mapped, as shown in FIG. 5B. FIG. 5A is a cut source for a three-sided IC. FIG. 5B is a partial visibility source for the three-sided IC. FIG. 5C is a target mesh for the three-sided IC.

The source and target meshes are processed independently and in parallel to obtain the conformal mapping. A first step triangulates and refines the template to a desired granularity so that the computations can be performed with sufficient accuracy. This is achieved by an edge split operation where a new vertex is iteratively introduced at the mid-point of each edge, doubling the number of triangles. The process is performed until the edge length falls below a user-specified threshold. Generally, edge sizes corresponding to 20 cm allow sufficiently accurate conformal maps to be generated at interactive speeds, while granularity below 5 cm yields only marginal improvements. In addition to the performance constraints, the edge threshold also depends on the resolution of target displays.

The mesh is then finely tessellated and a single closed boundary is contained. Next, a single triangle is removed so that the resulting mesh can be mapped to a complex plane. The triangle at a center of the mesh is selected, or selection is made farthest from an original boundary. The same triangle is removed from both the source and target meshes. A 3-vertex correspondence between the meshes is stored, which will be used to align planar projections of the conformal maps. These vertices are selected from among the common vertices on the original closed boundaries. The cube geometry to a sphere is then mapped by the direction map utilizing Equation (1):

$$p \to \frac{p-c}{|p-c|} \quad (1)$$

In Equation (1), p is a point on the cube and c is the center of the cube. A shortest path is computed along the edges of the mesh between the original boundary γ2 and the newly created boundary γ1 at the center of the mesh. Since the embedding in the complex plane is periodic, the exact shape of τ is not important. However, for consistency, the same cut is made on both the source and the target meshes.

Next, the discrete Ricci flow algorithm is used to compute the conformal mapping to the unit disc. This mapping is stored as UV coordinates at the vertices of the two meshes and a Möbius transformation is used to align the two conformal maps based on vertex correspondence. Möbius transformations are used to map point triplets to 1; i and −1 on a unit circle, which aligns corresponding markers. For example, using {p; q; r} as three markers on the unit circle, Equation (2) is utilized to map the three markers to {0;∞;−1}.

$$\eta_1(z) = \frac{z-p}{z-q}\frac{r-q}{r-p} \quad (2)$$

Mapping is then performed from {p; q; r} to {1; i;−1} using Equation (3):

$$\eta_2(z) = \frac{1+i}{2}\frac{z-1}{z-i} \quad (3)$$

Figure 6A:
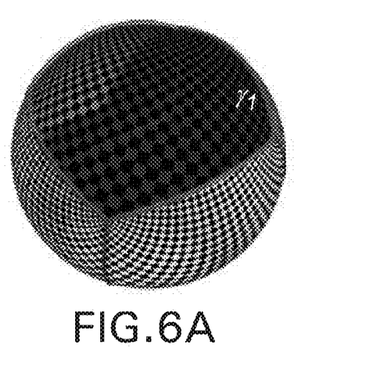
FIG. 6A is a spherical map for the five-sided IC.
Figure 6B:
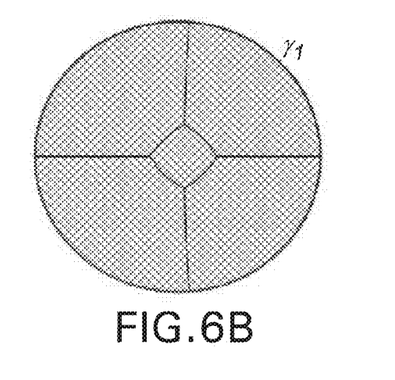
FIG. 6B is a conformal mapping of the spherical map of FIG. 6A to a unit disc.
Figure 6C:
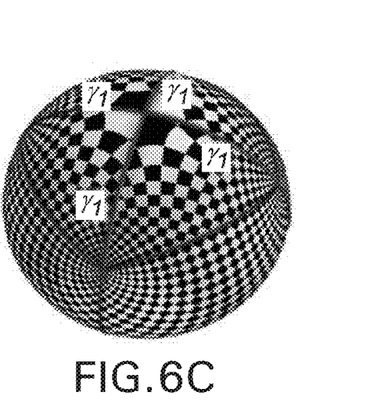
FIG. 6C is a spherical map for a six-sided IC.
Figure 6D:
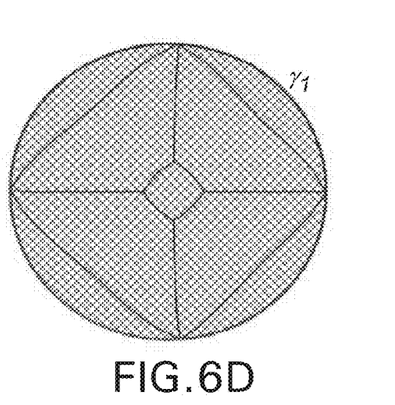
FIG. 6D is a conformal mapping of the spherical map of FIG. 6C to a unit disc.

In Equation (3), η−1∘η1 is the desired Möbius transformation. FIGS. 6A and 6C illustrate spherical mappings of five-sided and six-sided ICs, respectively. FIGS. 6B and 6D show results of the Möbius transformation, i.e., conformal mappings of the ICs of FIGS. 6A and 6C, respectively, mapped to a unit disc after alignment. FIG. 6A is a spherical map for the five-sided IC. FIG. 6B is a conformal mapping of the spherical map of FIG. 6A to a unit disc. FIG. 6C is a spherical map for a six-sided IC. FIG. 6D is a conformal mapping of the spherical map of FIG. 6C to a unit disc.

According to an embodiment of the present invention, the discrete Ricci flow algorithm may include associating each vertex of the source mesh with a circle ($v_i$, $y_i$) where $y_i$ equals a minimal length of any edge in the immediate neighborhood of $v_i$, computing an intersection angle $\Theta_{ij}$ with a circle packing metric close to an induced Euclidean metric, computing, for each vertex of a source mesh, a curvature at the vertex of the source mesh and a corresponding vertex of a target mesh, adjusting a conformal factor in proportion to a difference between the curvature of the source mesh and the curvature of the corresponding vertex of the target mesh, updating the circle packing metric, and recomputing the curvatures. The discrete Ricci flow algorithm is repeated until a computed curvature less than a predetermined threshold is obtained.

After the mesh processing, cubemaps are generated with both the source and the target meshes containing aligned conformal mappings to the two-dimensional (2D) complex plane stored in a UV channel at each vertex, and further processing is performed on a Graphics Processing Unit (GPU) using NVIDIA Cg programming language shaders. A vertex shader computes a viewing direction through each vertex in the source mesh and a result is stored in a vertex color attribute. The shader also flattens the mesh to the unit disc by copying the UV coordinates to the vertex position attribute. In the pixel shader, interpolated vertex colors are rendered to a high-resolution floating-point Red-Green-Blue (RGB) texture having texture corresponding to the circular map in 3D where each pixel encodes a viewing direction. The reference point for computing these directions is specified by the user and is not necessarily the same point used to define the mesh template cuts.

Figure 7A:
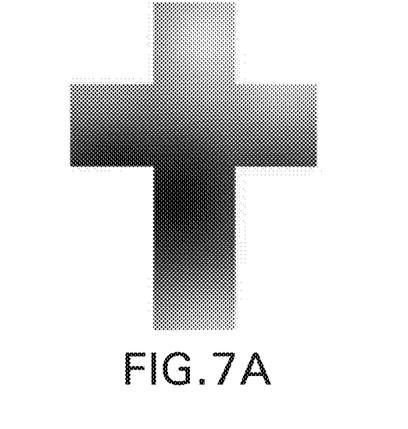
FIG. 7A is a cubemap for a $T_{ray}$ conformal transformation based on a six-sided IC.
Figure 7B:
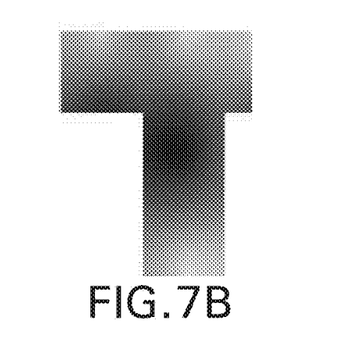
FIG. 7B is a cubemap for the $T_{ray}$ conformal transformation based on a five-sided IC.
Figure 7C:
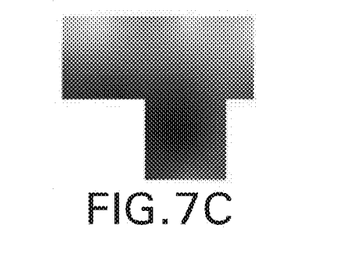
FIG. 7C is a cubemap for the $T_{ray}$ conformal transformation based on a four-sided IC.
Figure 7D:
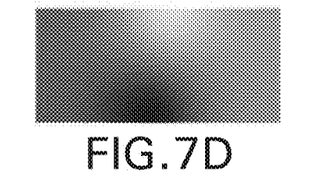
FIG. 7D is a cubemap for the $T_{ray}$ conformal transformation based on a three-sided horizontal arrangement of displays.

The texture is then mapped onto the target mesh and the pixel shader renders the view directions onto the faces of a cubemap. This cubemap is a discretization of a conformal transformation $T_{ray}$ that maps the viewing directions of the target visual environment to the corresponding directions on the full visibility sphere. FIG. 7A illustrates an original cubemap for a Tray conformal transformation based on a six-sided IC. FIG. 7B illustrates the cubemap created for the $T_{ray}$ transformation for the five-sided IC. By reversing the source and the target meshes, the $T_{mesh}$ transformation is computed from the set of all viewing directions to the visibility defined by the boundaries of the target mesh. FIG. 7C is a cubemap for the $T_{ray}$ conformal transformation based on a four-sided IC, and FIG. 7D is a cubemap for the $T_{ray}$ conformal transformation based on a three-sided horizontal arrangement of displays.

Direction vectors for both the circular maps and the cubemaps are stored in RGB textures with 32-bit per-channel precision. The resolutions can be set to 4096×4096 and 1024×1024, although smaller textures can be used with minimal loss of directional accuracy if GPU resources are limited. However, if the rendering is performed on older GPU hardware that does not support linear filtering of 32-bit floating point textures, the largest supported resolution should be used with nearest neighbor sampling. Alternatively, the precision can be reduced to 16 bits per channel, although the resulting loss of accuracy in the direction vectors may lead to objectionable rendering artifacts, with cubemaps for the three visualization targets from the mesh templates shown in FIGS. 7B-7D.

Conformal mapping according to embodiments of the present invention, as described above, may be implemented as a library integrated into existing visualization applications with a cubemap generator class containing a minimal interface for updating parameters such as edge threshold and reference cut points, as well as for notifying the main application when the cubemaps are updated. The $T_{ray}$ and $T_{mesh}$ transformations that are computed provide support for both forward and backward rendering pipelines. Mesh rendering may be applied with Open Graphics Library (OpenGL), single-pass raycasting for Direct Volume Rendering (DVR) and real-time raytracing on the GPU. The conformal mapping may also be used with a dynamic visibility manipulation technique based on the user's position in a tracked VR environment.

To perform mesh rendering, the conformal visualization is first applied to a mesh-based rendering pipeline, and a vertex-based transformation for rendering well-tessellated geometry with OpenGL is used. In the present example, each vertex in a scene is transformed so that triangles that are projected on the top screen in a six-sided CAVE configuration are instead projected on the four side screens in a five-sided configuration, by a transformation defined by Equation (4):

$$r_c = (M^{-1})^T \cdot \text{norm}(p_w - M^{-1} \cdot [0,0,0,1]^T)$$

$$Pw - M^{-1} \cdot (T_{geom}(r_c) \cdot |M_{Wc} \cdot P_w|), \quad (4)$$

In Equation (4), $P_w$, is the vertex position in world-space, $r_c$ is the normalized view direction in CAVE space and $M_{wc}$ is a world-space to CAVE-space transformation matrix. In a rendering framework according to embodiments of the present invention, a head node for the visualization cluster emits camera information to all the rendering clients and a view matrix (V) associated with that camera is the world-space to CAVE-space transformation matrix. Each visualization node then computes final view and projection matrices based on target projection surfaces. The geometry transformation is performed in a custom vertex shader that is bound to each primitive in the scene.

The conformal transformation is applied in a similar fashion for direct volume rendering. The visualization algorithm is based on single-pass raycasting over 3D textures with support for advanced lighting and shadowing, as well as pre-integrated transfer functions. A framework according to embodiments of the present invention integrates volume rendering tightly into the scene graph, with volume-space positions of front and back faces of a volume bounding box rendered out, modified by the depth of other scene geometry, e.g., by incorporating the distortion map to tessellate the bounding box and apply a $T_{geom}$ transformation.

A target application of conformal mapping according to embodiments of the present invention is the exploration of the virtual colonoscopy data, in which case the camera is often within the volume and the starting positions of the rays are defined on the near clipping plane. In this particular case, improved accuracy is obtained by transforming positions on a near clipping plane and the back face of the bounding volume to world-space and then applying the transformation of Equation (5):

$$r_c = (M^{-1}) \cdot \text{norm}(p_w - M^1 \cdot [0,0,0,1]^T)$$

$$P_w = M^{-1} \cdot (T_{ray}(r_e) \cdot |Mw_e \cdot P_w|) \quad (5)$$

In Equation (5), $p_w$ is the vertex position in world-space, r is the normalized view direction in CAVE space and $M_{wc}$ is the world-space to CAVE-space transformation matrix. The viewing vector is then constructed from the modified starting and ending positions, resulting in a transformation that is very similar to that of Equation (4), except that since this is a backward rendering pipeline, direct transformation of the view directions and the $T_{ray}$ cubemap is used.

A limitation of a geometry transformation approach is that existing shaders need to be modified according to Equation (5). Although not an issue for the virtual colonoscopy mesh dataset, which contains a single shader, difficulties arise for large architectural scenes that contain dozens of materials and non-uniformly tessellated meshes. A GPU-based raytracing algorithm provides interactive frame-rates for large geometric models, and a raytracing renderer is integrated with a scene graph based on the NVIDIA OptiX engine. OptiX accelerates raytracing on the GPU by defining ray-generation, ray-scene intersections and shading programs in the Compute Unified Device Architecture (CUDA) programming language, which access traditional acceleration structures that are also stored on the GPU. The programs are then intelligently scheduled on each CUDA-enabled GPU in the system. For conformal visualization according to embodiments of the present invention, the ray transformation is applied at the ray-generation level, which is separate from the scene-graph and therefore much simpler to re-implement, with distortion computation simplified as according to Equation (6):

$$dw \cdot (\text{Tray}((M^{-1})^T \cdot dw)) \quad (6)$$

Similar to the volume rendering approach, the world-space ray direction ($d_w$) is transformed to CAVE-space and a new ray direction is fetched from the conformal map. CUDA, and by extension OptiX, does not currently support cube textures natively, therefore indexing the conformal map is implemented in the ray-generation program. The conformal map generation stage of a pipeline is augmented to copy the pixel data to a 2D texture in the vertical cross format. In addition to simplifying the application of the conformal map, the ray-tracing enables a number of effects that are particularly suitable for architectural visualization, such as dynamic shadows, global illumination, reflections and refractions.

For dynamic visibility manipulation and computer pairing of source and target meshes, a conformal visualization pipeline generates the conformal ray transformations entirely on the GPU, allowing for real-time updates to the reference point used to compute the per-vertex view directions. In a tracked VR environment, the reference point generally tracks the user's head position to allow for more accurate visibility retargeting as the user moves through the environment. For example, as the position approaches a corner of the five-sided CAVE, the visual information from the missing top projection would be presented onto the three visible surfaces. According to an embodiment of the present invention, the head-tracking is decoupled for rendering from the tracking of the reference point. This allows users to control the conformal transformation without changing their field of view by moving inside the tracked environment. In particular, moving the reference point perpendicular to a missing projection surface affects the size of the distortion induced by the conformal transformation and allows for zooming in and out of the new visual data. At the same time, the context for the visual manipulation and the local shapes in the scene are preserved by the conformal visualization.

While the invention has been shown and described with reference to certain embodiments thereof, it will be understood by those skilled in the art that various changes in form and detail may be made therein without departing from the spirit and scope of the invention as defined by the appended claims and equivalents thereof.

What is claimed is:

1. A method for obtaining a conformal mapping of first image data corresponding to a source mesh to a target mesh, the method comprising:
   generating a template of the source mesh and a template of the target mesh; processing, by a Graphical Processing Unit (GPU), the generated source mesh template and the generated target mesh template to obtain a conformal mapping from the source mesh to the target mesh;
   mapping the first image data corresponding to the source mesh to second image data corresponding to the target mesh according to the obtained conformal mapping; and
   outputting a mapped texture corresponding to the mapped second image data to the display corresponding to the target mesh,
   wherein the source mesh corresponds to a first number of sides of a cube, and the target mesh corresponds to a second number of sides of the cube, where the first number of sides corresponding to the source mesh is greater than the second number of sides corresponding to the second mesh,
   wherein processing the generated source and target meshes comprises:
   triangulating and refining the generated source and target templates to a desired granularity, tessellating the refined source and target meshes such that the tessellated source and target meshes each have a single closed boundary, selecting, from each of the refined source and target meshes, a triangle positioned at a center of the respective mesh, removing the selected triangle from the refined source and target mesh, respectively, storing a three-vertex correspondence between the source and target meshes, mapping cube geometry of the source and target meshes to spheres by a direction map, and computing, for each of the refined source and target meshes, the conformal mapping to a unit disc according to the stored three-vertex correspondence, wherein the conformal mapping is obtained using a discrete Ricci flow algorithm, in which a Mobius transformation is used to align the stored three-vertex correspondence between the source mesh and the target mesh, wherein the discrete Ricci flow algorithm includes associating each vertex of the source mesh with a circle (vi, yi) where yi equals a minimal length of any edge in the immediate neighborhood of vi, computing an intersection angle Θij such that a circle packing metric is close to an induced Euclidean metric, computing, for each vertex of the source mesh, a curvature at the vertex of the source mesh and a corresponding vertex of the target mesh, adjusting a conformal factor in proportion to a difference between the curvature of the source mesh and the curvature of the corresponding vertex of the target mesh, updating the packing metric, recomputing the curvatures, wherein the discrete Ricci flow algorithm is repeated until a current computed curvature is less than a predetermined threshold, wherein the source mesh corresponds to six complete sides of a cube, and the target mesh corresponds to five complete sides of the cube and one-fourth of a sixth side of the cube, and wherein the sides of the cube respectively correspond to four side walls, a floor, and a ceiling of a display room onto which the output mapped texture is displayed.

2. The method of claim 1, wherein the triangulation is performed according to an edge split operation where respective vertexes of each of the source and target meshes are iteratively introduced at mid-points of each edge of the source and target meshes until edge lengths of the refined source and target meshes fall below a predetermined threshold.

3. The method of claim 1, wherein mapping the first image data to the target mesh comprises:

computing a viewing direction through each vertex of the source mesh and storing each computed viewing direction in a vertex color attribute;

flattening the source mesh to a unit disc by copying UV coordinates to a vertex position attribute; and mapping a texture of the first image data onto the target mesh and using a pixel shader to render viewing directions of the target mesh on to faces of a cubemap.

4. The method of claim 3, wherein the cubemap is discretization of a conformal transformation that maps the viewing directions of the target mesh to corresponding directions on a full visibility sphere.

5. The method of claim 1, wherein outputting the mapped texture comprises rendering the mapped texture according to at least one of mesh rendering, direct volume rendering, and raytracing.

6. The method of claim 5, wherein the mesh rendering is performed by applying the conformal visualization to a mesh-based rendering pipeline.

7. The method of claim 5, wherein the direct volume rendering is performed based on a single-pass ray-casting over three-dimensional textures.

8. The method of claim 1, wherein at least one of the source mesh and the target mesh corresponds to a partially-immersive visualization platform.

9. The method of claim 8, wherein the partially-immersive visualization platform provides an immersive cabin having at least three sides.

10. The method of claim 1, wherein first image data includes at least one of medical data and architectural data.

* * * * *